March 10, 1936. R. B. McFERRAN 2,033,438
CABIN STRUCTURE
Filed June 13, 1933 6 Sheets-Sheet 5

March 10, 1936.　　　R. B. McFERRAN　　　2,033,438
CABIN STRUCTURE
Filed June 13, 1933　　　6 Sheets-Sheet 6

Inventor,
Robert B. McFerran,
By Henry P. Bright
Attorney

Patented Mar. 10, 1936

2,033,438

UNITED STATES PATENT OFFICE 2,033,438

CABIN STRUCTURE

Robert Bayard McFerran, Minneapolis, Minn.

Application June 13, 1933, Serial No. 675,519½

3 Claims. (Cl. 20—2)

This invention relates to cabin structures, and the general object of the invention is to provide a knockdown cabin structure of simple, economical, practical, durable, and efficient construction, and which will be an improvement generally over more or less similar structures heretofore known.

A more explicitly stated object is to provide a knock-down cabin which will consist of separate units each of compact size to be readily transportable in groups, and each so constructed and related to other units of the cabin that all of the units can be conveniently assembled and rigidly fastened together, to produce the completely constructed cabin, by the employment of ordinary bolts requiring merely, and only, a common type of wrench to effect their manipulation.

A further explicitly stated object is to provide a cabin structure which will, in its entirety, consist of separate, compact, knock-down, portable units, all adapted to be easily and conveniently bolted together to produce said cabin structure.

A still further object is to provide a knockdown, portable, bolted cabin which can be just as easily disassembled as assembled, whereby the cabin once set up can be readily knocked down and shipped to another place and there again set up, neither the setting up nor the pulling down of the cabin of the present invention being calculated to, or liable to, mar or harm any of the separate units, elements, or parts of said cabin.

And a still further object is to provide in the knock-down, portable, bolted cabin structure, various improved, more or less specific, features and characteristics of construction which will be novel, both as individual entities of said structure and in combination.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification.

With respect to Figs. 1 to 14 of the drawings, and the numerals of reference thereon, 25 represents spaced apart supporting members, three as shown, for the cabin, said supporting members extending lengthwise of the cabin and being suitably embedded into the ground. See Figs. 1 and 3. The supporting members 25 constitute the foundation for the cabin. The cabin foundation could, of course, be otherwise constructed. For example, said foundation could be a solid bed of concrete.

The foundation or supporting members 25 carry the skids 26 of the cabin. As disclosed, there are three skids 26, resting upon and extending longitudinally of the members 25. See Figs. 1, 2, 3, 9 and 13. Two skids might suffice in some particular instance, or more skids than three could be employed.

The cabin includes a plurality of spaced apart, lower or floor joists 27 and 28, which extend crosswise or transversely of said cabin and rest upon the skids 26. The lower or floor joists 27 are wider than the floor joists 28, which are intermediate lower or floor joists. All the floor joists 27 and 28 are desirably spaced at equal distances apart, and are of length approximately equal to the width or breadth of the cabin, while said floor joists as a group, are spaced along the cabin from end to end thereof. See Figs. 1, 2, 3, 6, 9 and 13.

The end floor joists 27 are detachably bolted to the end portions of each skid, as by headed and nutted bolts 29, while the floor joists 28 are detachably bolted to the intermediate portions of each skid, as by headed and nutted bolts 30.

Each floor joist 27 and 28, supports a side studding, designated 31 and 32, at each end of the floor joist, said floor joist and its studding desirably constituting a unit of the cabin. As disclosed the side studdings 31 and 32 are detachably fastened to the floor joists by headed and nutted bolts 33. See Figs. 9, 12 and 13. In the finished cabin, the side studdings extend vertically upward from the floor joists.

The cabin also includes a plurality of spaced apart, upper or ceiling joists 34, one corresponding to each of the floor joists 27 and 28 and arranged directly thereabove. The ceiling joists 34 are, naturally, spaced at equal distances apart, and are also of length equal to the width or breadth of the cabin. Said ceiling joists are arranged parallel to the floor joists, and, as a group, are spaced along the cabin from end to end thereof. See Figs. 1, 3 and 5.

Each ceiling joist 34 supports an inwardly extending roof rafter, denoted 35 and 36, at each of the opposite ends of the ceiling joists, a ceiling joist and its rafters desirably constituting a unit of the cabin, said unit additionally including a collar beam 37 which connects the rafters 35 and 36 at points intermediate the ends of the latter, the rafters 35 and 36 having their inner ends mitered to suitably fit or engage against each other. As disclosed, the rafters 35 and 36 are detachably fastened, adjacent their outer ends, to the ceiling joists 34 by headed and nutted bolts 38, and each collar beam 37 is detachably fastened, at its ends, to said rafters 35 and 36 by headed and nutted bolts 39. The collar beams 37 are horizontally disposed, and said rafters are of equal and sufficient length so that their abutting ends are at the longitudinal center of the cabin and their overhanging portions terminate at equal distances from the side studdings. See Figs. 3, 10 and 11.

Each headed and nutted bolt 38 which attaches a rafter 35 or 36 to a ceiling joist 34, may also attach an end of each of said ceiling josists to a side studding 31 or 32, as the case may be, upon the floor joist directly therebeneath. All of the floor joists, all of the ceiling joists, and all of the roof rafters are attached to the same sides of the side studdings, except one floor joist, one ceiling joist, and one set of rafters, these latter joists and rafters being at an extreme end of the cabin, outside of the endmost side studdings, as will be understood. All of the collar beams 37 except one may also be attached to the same sides of the rafters, for the sake of uniformity, but each end collar beam should be at the inner side of the rafters which carry it. It will be seen that the end ceiling and floor joists of the cabin are in vertical alinement with each other at the outer sides of the end side studdings, while the end rafters are desirably at the outer sides of the end ceiling joists, at the extreme ends of the cabin.

It will also be seen that the skids 26, the end floor joists 27, the intermediate floor joists 28, the studdings 31 and 32, the ceiling joists 34, the rafters 35 and 36, and the collar beams 37, all constructed in separate units as set forth, will, when bolted together, constitute a base structure for the cabin. Said base structure additionally includes a ridge beam 40, a plurality or pair of tie beams 41, and end studdings 42. The ridge beam 40 extends from end to end of the cabin at the longitudinal center thereof, just below the peak, being detachably fastened against the lower edge of each collar beam 37 by headed and nutted bolts 43 which pass vertically through said collar beams and ridge beam. See Figs. 1, 3, 5, and 10. The tie beams 41 also extend from end to end of the cabin, but adjacent the sides thereof, being detachably fastened against the upper edge of each upper or ceiling joist 34, not far from the ends of said upper or ceiling joists, by headed and nutted bolts 44 which pass vertically through the joists 34 and the tie beams 41. See Figs. 3 and 5. The end studdings 42 are of variant lengths, depending upon their locations transversely of the cabin, extending from flooring, or upper or ceiling joists, to roof. Said end studdings 42 are detachably fastened, at the opposite ends of the cabin, against the inner surfaces of the end upper or ceiling joists 34 by headed and nutted bolts 45, and against the upper portions of the inner surfaces of the end lower or floor joists 27 by headed and nutted bolts 46. The end studdings 42 are, however, not ordinarily incorporated into the structure until after the flooring of the cabin is laid, in a manner to be set forth.

Figure 6:
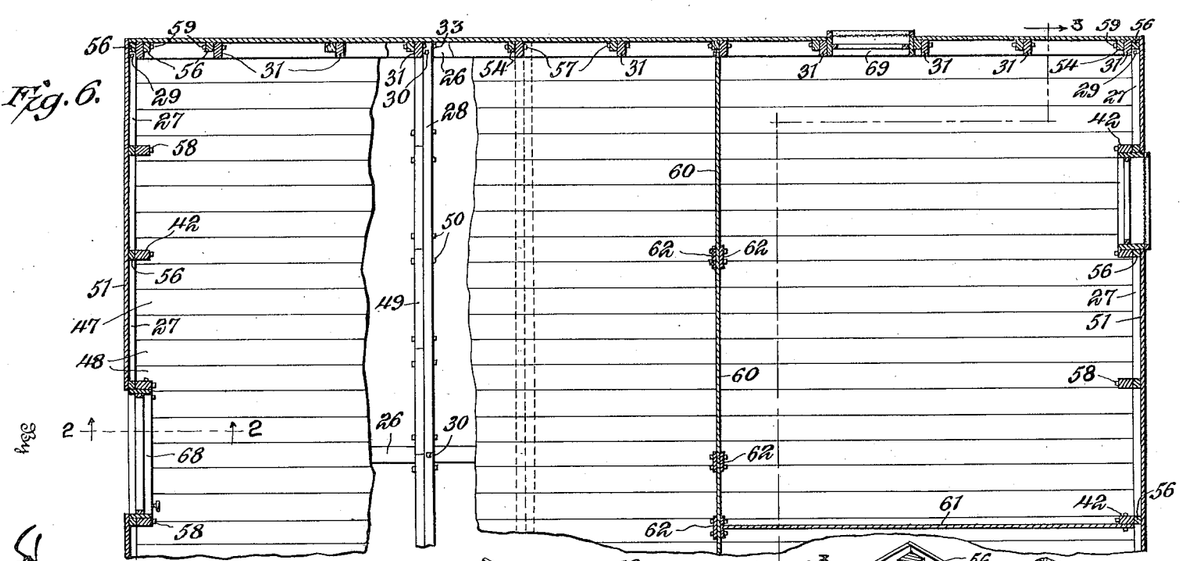
Fig. 6 is a horizontal sectional view, taken as on line 6—6 in Fig. 1, showing the floor of the cabin in plan, and partition walls thereof in section.
Figures 7, 8:
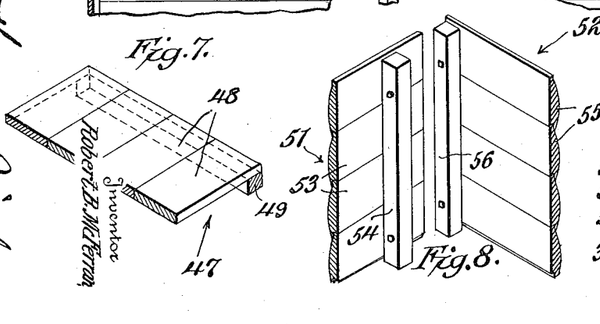
Fig. 7 is a perspective view showing a portion of one of the units which constitute the flooring of the cabin.
Fig. 8 is a perspective view showing a portion of one of the units which constitute the sidings and a portion of one of the units which constitute the endings of the cabin.
Figure 9:
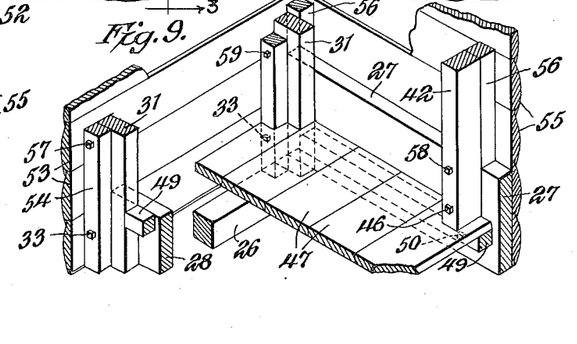
Fig. 9 is a perspective view, partially in section and partially broken away, of one of the lower corners of the cabin, looking at the inside thereof, disclosing a manner of joining together the side studdings and lower joists, and also showing a portion of the flooring and its relation to the side and end studdings and lower joists, as well as portions of a siding and an ending of the cabin and their relation to each other and to a corner studding, a side studding, and an end studding.
Figure 10:
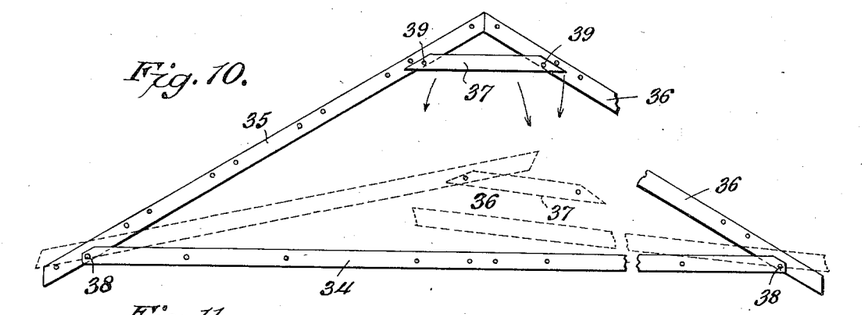
Fig. 10 is an elevational view, partially broken away, disclosing a manner in which a ceiling joist of the cabin, the rafters adjacent said ceiling joist, and the collar beam for said mentioned rafters, can be constructed as a single unit, the present view also disclosing, in dotted lines, one end portion of said collar beam released from a rafter, and the rafters, with collar beam, as when being folded down against said upper joist, to the position as in Fig. 11.
Figures 11, 12:
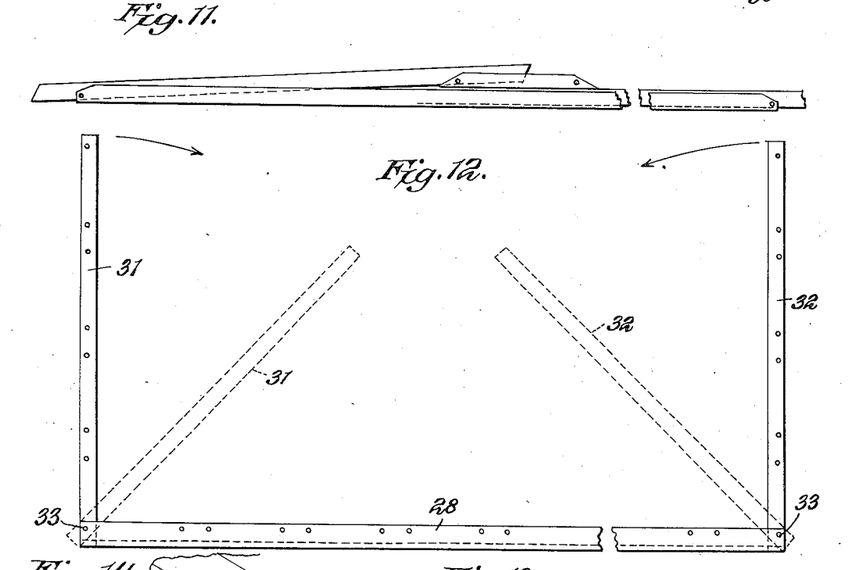
Fig. 11 is an elevational view, partially broken away, of the unit of Fig. 10, showing the rafters and collar beam folded down against the ceiling joist, to provide a compact unit for storage or shipment.
Fig. 12 is an elevational view, partially broken away, disclosing a manner in which a lower or floor joist of the cabin, and the side studdings adjacent said lower joist, can be constructed as a single unit, the present view also disclosing in dotted lines, said studdings as when being folded down, and as when folded down, against said floor joist, to provide a compact unit for storage or shipment.

A portion of one of the units which constitute the flooring 47 of the cabin is shown in Fig. 7, and the manner in which said flooring is laid or installed is very clearly disclosed in Figs. 1, 2, 3, 6 and 9. Each flooring unit consists of several adjacent planks 48 of preferably tongue and groove lumber, making a width conveniently handled, across the lower surfaces of which spaced apart cleats 49 are attached. The flooring units are desirably approximately the length of the cabin, and the cleats 49 are spaced apart distances equal to the distances between the intermediate floor joists 28, including end cleats 49 adapted to be closely adjacent to or contiguous with the end floor joists 27. The intermediate cleats are adapted to be closely adjacent to or contiguous with the intermediate joists 28 when the flooring is laid on the floor joists, with a cleat 49 at a side of each of said lower joists. Headed and nutted bolts 50, which extend horizontally and pass through the lower or floor joists 27 and 28 and through the cleats 49, detachably fasten the flooring to said floor joists. The flooring is laid section by section, a later laid section being properly fitted against an earlier laid one, and, naturally, the edge portions and the corner portions of the flooring are suitably cut away at the factory to clear the side studdings, etc., as will be understood. The cleats 49 are all attached to the tongue and groove lumber at the factory, and the bolt holes through said cleats, as well as through all others of the parts to be bolted, are suitably prepared at the factory.

A portion of one of the units which constitute the sidings 51 of the cabin is shown in Fig. 8. Said Fig. 8 also discloses a portion of one of the units which constitute the endings, or ending units, 52 of said cabin. The manner in which the sidings 51 and the endings 52 are installed is very clearly disclosed in Figs. 1, 3, 5, 6, 9 and 14. Each siding unit consists of several adjacent planks 53 of desirably shiplap lumber having curvilinear outer surfaces, making a width conveniently handled, across the inner surfaces of which spaced apart cleats 54 are attached. Each ending unit likewise consists of several adjacent planks 55, of similar lumber, across the inner surfaces of which spaced apart cleats 56 are attached. The siding and ending units are desirably the length of the cabin, and the cleats 54 are spaced apart distances equal to the distances between adjacent side studdings 31, 31 and 32, 32, while the cleats 56 are spaced apart distances equal to the distances between adjacent end studdings 42, 42. The cleats 54 are adapted to lie between the studdings 31, 31 and 32, 32, with a cleat adjacent to or contiguous with each studding, at a side thereof, and the siding units are adapted to lie against said studdings 31 and 32, with the ends of the siding units terminating flush with the outer surfaces of the corner or end side studdings. The cleats 56 are adapted to lie up against the end studdings 42, so that the siding units and the ending units of the cabin corner up with each other. See Figs. 1, 2, 5, 6 and 9. Headed and nutted bolts 57, which extend horizontally and pass through the intermediate side studdings 31 and 32 and the intermediate cleats 54, detachably fasten said intermediate cleats of the siding units to said studdings 31 and 32, and headed and nutted bolts 58, also extending horizontally, pass through the intermediate end studdings 42 and the intermediate cleats 56 to detachably fasten said intermediate cleats of the ending units to said studdings 42. At the corner of the cabin, headed and nutted bolts 59 extend through the outermost or end cleats 54 and 56 and through the corner or end side studdings 31 and 32 to make the structure integral at these locations. The sidings and endings are installed by sections, a later installed section being properly fitted against an earlier installed one. The cleats 54 and 56 are all attached at the factory, and the bolts 58 and 59 are inserted, with the bolt heads thereof countersunk in the outer surfaces of the cleats 56, before the shiplap planks 55 are attached to said cleats. The endings or ending units 52 are built up to the rafters 35 and 36 at the opposite ends of the cabin, as will be more clear from Figs. 1, 2 and 3, diminishing in length from the ceiling joists to the peak. It will be evident that the opposite, oblique ends of the endings or ending units are fitted against the lower edges of said end rafters. The cleats 56 lie in the vertical plane of the end floor joist just below the end ceiling joist just above said floor joist, and are of thickness to cause the endings or ending units each to lie in a vertical plane directly beneath end rafters, as will be understood.

The cabin includes vertical partition walls, there being a transverse partition wall 60, and a narrower, longitudinal partition wall 61. These walls may conveniently consist of composition board. As disclosed, they extend from floor to ceiling joists. The side edges of the wall 60 are suitably attached, as by bolting, to oppositely disposed side studdings 31 and 32, as shown more clearly in Fig. 6, and reinforcing members 62, extending vertically as disclosed, are bolted against opposite surfaces of said wall 60 at suitably spaced apart locations. A side edge of the wall 61 is bolted to an end studding 42, and the opposite side edge of said wall 61 is fitted between vertical reinforcing pieces 62 upon the wall 60, as also very clearly shown in Fig. 6. Thus, the partition walls are stably supported.

The roof of the cabin is made up in separate units 63 each desirably consisting of planks 64 of suitable shiplap lumber, of convenient width to handle, across the lower surfaces of which spaced apart cleats 65 are attached. The cleats 65 are spaced at the same distances apart as are the rafters 35 and 36, and the roof units are of length to overhang at the opposite ends of the cabin. See Fig. 1. A sufficient number of roof units are employed so that the side edges of the roof overhang the siding units of the cabin. See Fig. 3. Different sections of the roof meet at the peak thereof, and the cleats lie closely adjacent to or contiguous with the rafters, at a side thereof, when the planks of said roof rest upon said rafters. Headed and nutted bolts 66, which extend horizontally, pass through the rafters and the cleats 65 to detachably fasten the roof to the rafters. Certain of the bolts 66 pass through the upper ends of the end studdings. The sections for the roof are completed at the factory.

Figure 1:
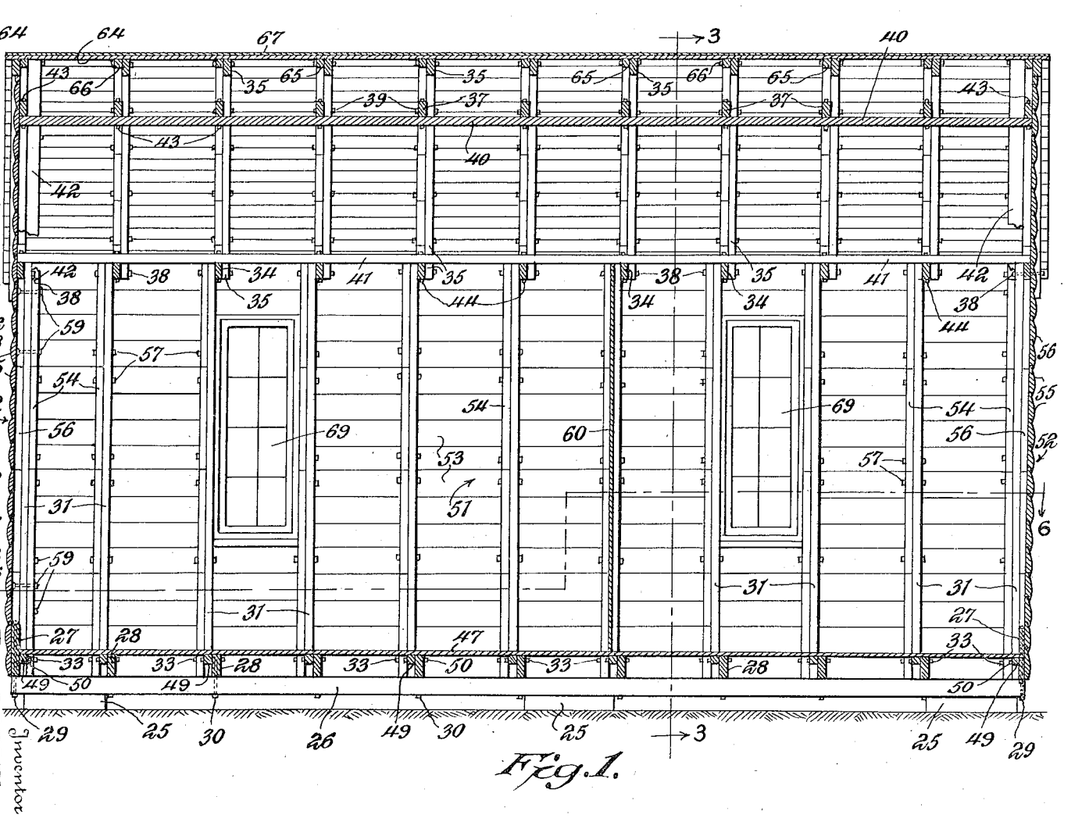
Fig. 1 is a vertical, longitudinal sectional view of a cabin constructed in accordance with the invention, taken as on line 1—1 in Fig. 3.
Figure 2:
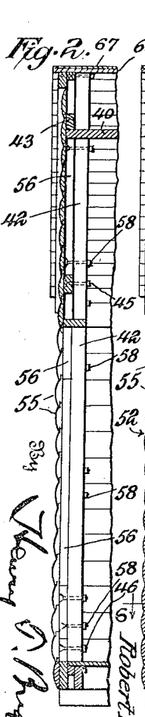
Fig. 2 is a fragmentary, vertical sectional view, through one of the cabin doors, taken as on line 2—2 in Fig. 6.
Figures 3, 4, 5:
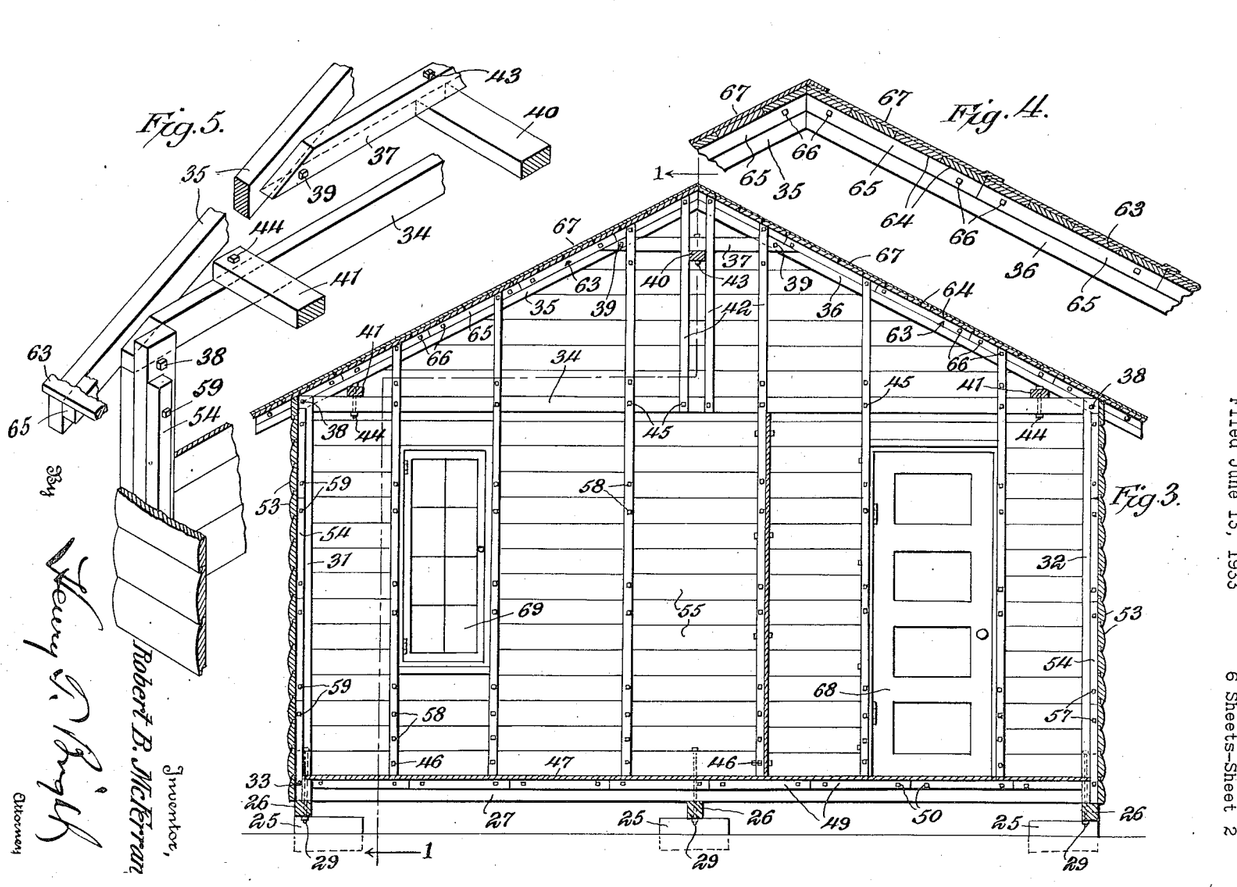
Fig. 3 is a vertical, transverse sectional view of the cabin, taken as on line 3—3 in Figs. 1 and 6.
Fig. 4 is a detail sectional view of the roof of the cabin.
Fig. 5 is a perspective view, partially in section and partially broken away, of one of the upper corners of the cabin, looking toward the outside thereof, disclosing a manner of joining together the studdings, rafters and ceiling joists, and also showing portions of a collar beam, a tie beam, and the ridge beam and their relation to each other and to the rafters and ceiling joists, as well as portions of a siding and an ending of the cabin and their relation to each other and to a corner studding.

The roof is covered with roofing material 67, as best shown in Figs. 1, 3 and 4. Said material suitably overlaps at the peak of the roof, and at other suitable locations, the overlapping parts extending downwardly over the parts which they overlap.

From the disclosure and the foregoing description, it will be evident that the cabin of the invention is constructed, in its entirety, of separate units which can be readily assembled to produce the cabin by the mere use of a monkey wrench. The cabin can, obviously, be just as readily disassembled. The assembly and disassembly of the parts of the cabin are accomplished without liability of marring or harming any of said parts.

Figures 13, 14:
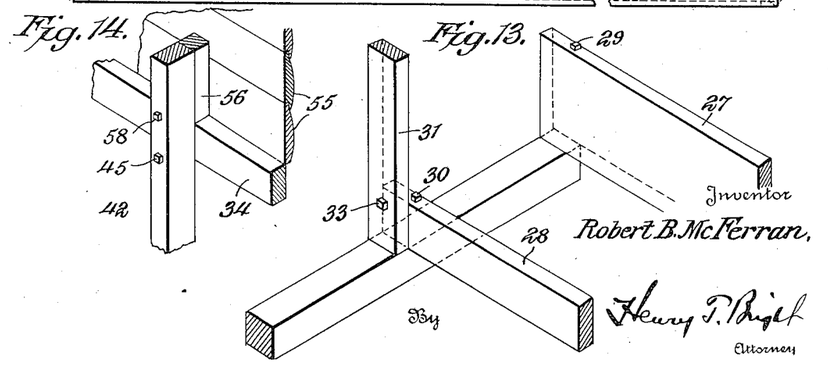
Fig. 13 is a fragmentary perspective view, disclosing an end lower or floor joist and an intermediate floor joist adjacent said end floor joist, the present view also showing a studding attached to said intermediate floor joist, and disclosing a manner in which the floor joists, themselves supporting the studdings, can be assembled with the skids for the cabin.
Fig. 14 is a fragmentary perspective view of an end studding of the cabin bolted to a ceiling joist thereof, the present view also disclosing a manner in which the endings or ending units may be fastened to the end studdings above the ceiling joists.

In constructing the cabin, the skids are first laid, and the end and intermediate floor joists, with side studdings attached, are placed upon said skids and fastened thereto, as suggested in Fig. 13. Then the ceiling joists, with the rafters and collar beams attached, are assembled with the side studdings of the cabin by the employment of the bolts 38. Then it is probably preferable to assemble and fasten in the ridge beam and the tie beams, and next perhaps the flooring. After the flooring is laid and fastened in, the end studdings can better be assembled and fastened in, and thereafter the sidings and endings, roof, partitions, etc., can be set up and attached, in any desired order. Or perhaps, when several workmen are laboring together, some of the different elements or parts going to make up the cabin may be simultaneously installed. That is to say, for example, one workman may be laying the flooring, while another is placing on the roof, and while still others are installing the end studdings, the sidings, and/or the endings. The partitions, doors and windows may be installed at any convenient time.

Figures 19, 20, 21:
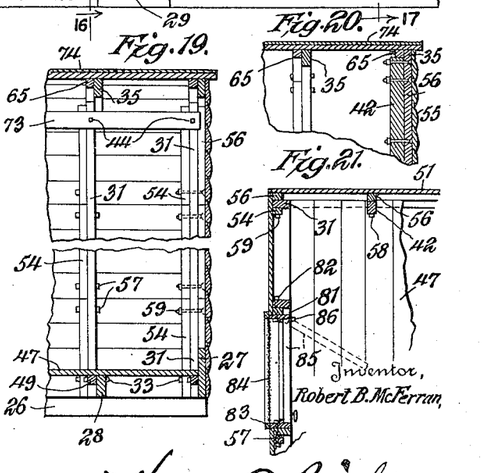
Fig. 19 is a fragmentary, vertical sectional view disclosing details, taken on line 19—19 in Fig. 15.
Fig. 20 is a fragmentary, vertical sectional view disclosing further details, taken on line 20—20 in Fig. 15.
Fig. 21 is a detail sectional view of a side window with screen of the cabins of Figs. 1 and 15.

The cabin shown in Figs. 1, 3 and 6 includes several doors 68 and several windows 69. Said doors and windows may be of ordinary or preferred construction, and may be suitably and conveniently mounted in the siding and/or ending units of the cabin. In Fig. 21 I have disclosed a special type of window of the cabin of Fig. 1, and I shall hereinafter fully describe said special type of window.

In Figs. 15 to 20, I have disclosed a cabin of variant construction, which is considerably like the cabin already described, but omits ceiling joists, such as 34, has a different type roof, and includes a door 70 of the unique construction to be set forth.

Instead of ceiling joists, the disclosure of Figs. 15 to 20 includes peak reinforcers 71, one detachably bolted to each of adjacent rafters 35 and 36, as by headed and nutted bolts 72, and the lower outer portion of each rafter 35, 36 is bolted to a corresponding studding by means of a headed and nutted bolt 38, which bolt 38 in the hereinbefore described form of the invention is employed to attach together a rafter, a ceiling joist, and a studding, with each end ceiling joist between said studding and rafter. Thus the end rafters of the cabin of Figs. 15 to 20 are in vertical alinement with the end lower or floor joists, and not outside thereof as is the case in the disclosure of Figs. 1 to 14.

Figures 15, 16:
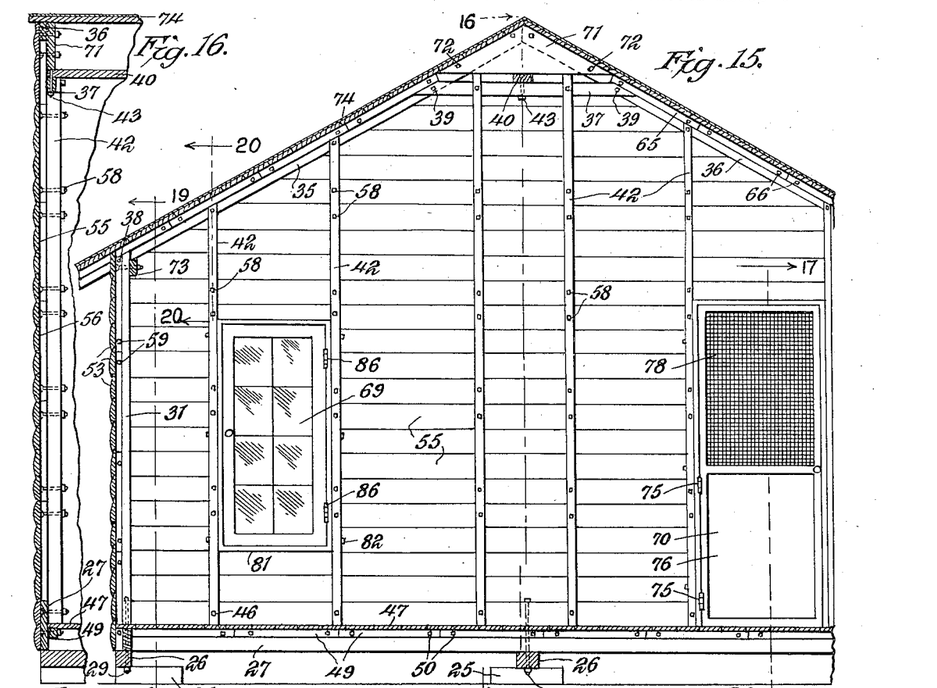
Fig. 15 is a vertical, transverse sectional view of a cabin of variant construction and incorporating the features of the invention.
Fig. 16 is a fragmentary, vertical sectional view, taken on line 16—16 in Fig. 15.

In the disclosure of Fig. 15, a floor joist, side studdings adjacent thereto, rafters attached to said side studdings, and the collar beam attached to said rafters, may desirably constitute a unit of the cabin. Obviously, said unit can be collapsed by removing a bolt 39, and folding the rafters outwardly to position against the studs, and the studs with rafters and collar beam attached inwardly down against the floor joist.

The peak reinforcers 71 are of triangular shape and are secured to the rafters at their apices, above the collar beams 37. All of said peak reinforcers are at the same side of the rafters, except that both of the end peak reinforcers are at the inner sides of the end rafters, so that the ending units or endings, placed on and attached to the end studdings in the manner as already described, have their upper portions fitted in overlapping relation against the end rafters, as will be more clear from Figs. 16, 19 and 20.

Tie beams 73, functioning in about the same manner as the tie beams 41, are bolted to the inner surfaces of the studdings 31 and 32 adjacent their upper ends.

The present form of the invention includes an integral, shaped slate coat roof 74 having its apex fitted to or over the peak of the cabin. Thus said roof 74 is completely weatherproof.

Figure 17:
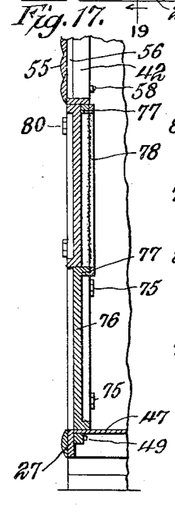
Fig. 17 is a detail sectional view of the door disclosed in Fig. 15, taken on line 17—17 in said Fig. 15.
Figure 18:
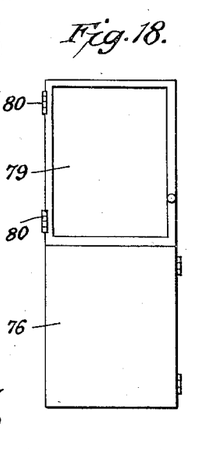
Fig. 18 is an elevational view of said door of Figs. 15 and 17, as seen from the rear in Fig. 15 and from the left in Fig. 17.

The door 70 is very clearly disclosed in Figs. 15, 17 and 18. As there shown, a door structure, mounted upon hinges 75 to be swung inwardly of the cabin, consists of a lower, solid part or panel 76 and an upper, open part 77, integral with the part 76, covered by a fly screen 78. The hinges 75 are carried by an ending unit of the cabin, although the door could be mounted in a siding unit of said cabin. A closure structure 79 for the open part 77 of the door structure, is mounted upon hinges 80 to be swung outwardly. The hinges 80 are also carried by the ending unit at location opposite the hinges 75, and the closure structure 79 may or may not, as is in a particular case desirable, include a pane of glass. The closure structure 79 may be equipped with means to lock it in open and closed positions. Obviously, when the closure structure 79 is in closed position, there is provided an ordinary door for the cabin. But said closure structure can be swung to open position, outside of the cabin, and fastened open, whereby the cabin door becomes a screen door.

In Fig. 21 I have disclosed a preferred type of window which can be part of the structure of the cabin of either form of the invention. As there shown, a siding or ending, a siding as disclosed, has an opening of rectangular shape. The window includes a rectangular frame 81 which removably fits said opening, and walls of said window frame lie adjacent side studdings 31 (or 32) or cleats 54 of the cabin structures. Headed and nutted bolts 82 pass through said studdings, cleats and window frame to detachably fasten the frame in the cabin. The outer portion of the window frame includes a surrounding flange 83 fitted against the outer surface of the siding. A fly screen 84 covers the outer portion of the frame 81, and a glass panel 85 covers the inner portion of said frame, said glass panel being hinged at 86 to swing inwardly. Clearly, the window of Fig. 21 is insertable into and removable from a cabin siding or ending as a unit, and can be assembled with and disassembled from the cabin by simple manipulation of the bolts 82.

Figure 22:
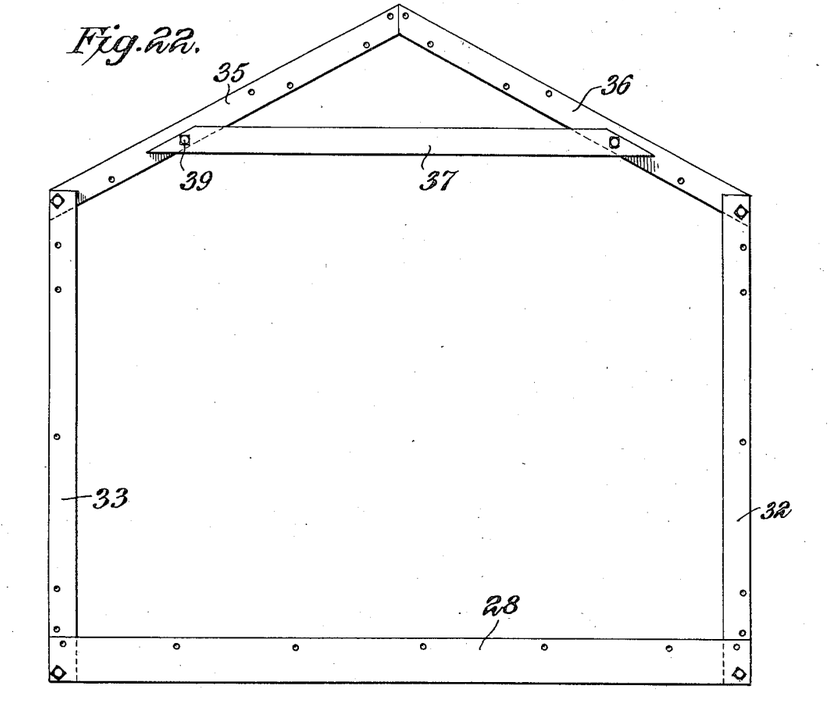
Fig. 22 is a view in elevation of a modified form of collapsible unit formed of a floor joist, wall studdings, roof rafters and collar beam, said unit being shown set up.
Figure 23:
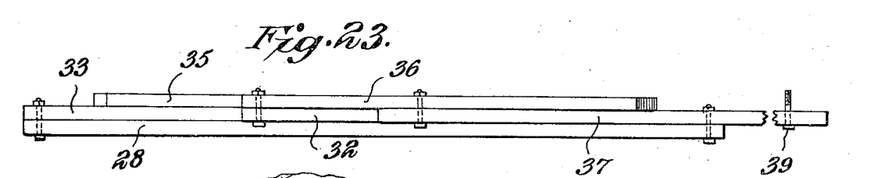
Fig. 23 is a view of the unit of Fig. 22 collapsed.

The modified form of collapsible unit shown in Figs. 22 and 23 includes the floor joist 28, wall studdings 31 and 32, roof rafters 35 and 36 and collar beam 37. By reference to Fig. 22 it will be apparent that collapsing of the unit into the form shown in Fig. 23 can be readily accomplished by simply removing one of the bolts 39, and then swinging the roof rafters outwardly and the wall studdings inwardly.

Figure 24:
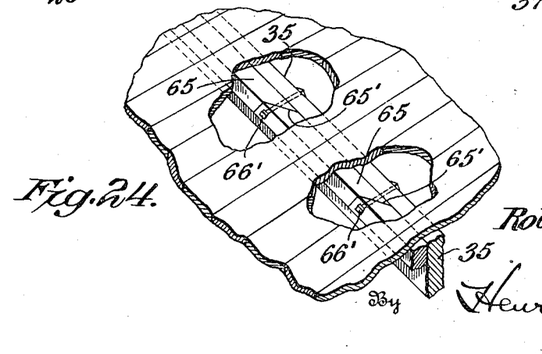
Fig. 24 is a detail perspective view showing a modified form of jointure between a roof rafter and adjacent roof board units.

In the jointure shown in Fig. 24 the cleats 65 of the roof board units have their ends chamfered as at 65' so that when the units are placed edge to edge the ends of adjacent cleats overlap. A single bolt 66' is then passed through the rafter 35 and the overlying ends of adjacent cleats. This construction greatly reduces the number of bolts required in setting up the cabin. While I have illustrated this modified jointure as applied to the assembly of roof rafters and roof board units it will be apparent that such jointure is also applicable to the connection between floor board units and floor joists and likewise applicable to the connection between the wall studdings and the wall board units.

What is claimed is:

1. A corner wall construction for knock-down buildings comprising a corner studding, wall sections at right angles to each other, said wall sections each including a transverse cleat, the cleat of one section lying against one face of the studding and the cleat of the other section lying against the opposite face of the studding, and bolts connecting said cleats to the studding, each of said bolts extending through both cleats, the studding and the material of one of the wall sections.

2. In a knock-down building, a structure for walls or roofs comprising a supporting member, covering sections made up of a plurality of elements connected together by transverse cleats bearing against one side of the supporting member, the cleats of each section having end formations which overlap mating formations of the ends of the cleats of adjacent sections when said sections are disposed edge to edge, and a single bolt passing through the overlapping ends of the cleats and the supporting member.

3. A corner wall construction for knock down buildings comprising a corner studding, wall sections, one of said wall sections including a transverse cleat disposed close to the corner edge of the section and the other of said wall sections including a transverse cleat spaced inwardly from its corner edge so that when said wall sections are positioned at right angles with the cleat of one section on one side of the studding and the cleat of the other section on the opposite side of the studding the corner edges will engage each other, and bolts connecting said cleats to the studding, each of said bolts extending through both cleats, the studding and the material of one of the wall sections.

ROBERT BAYARD McFERRAN.